United States Patent [19]

Hsieh

[11] Patent Number: 4,946,914

[45] Date of Patent: Aug. 7, 1990

[54] POLYMERIZATION PROCESS WITH MODIFIED CHROMIUM-CONTAINING CATALYST COMPOSITION

[75] Inventor: J. T. T. Hsieh, Warren, N.J.

[73] Assignee: Mobile Oil Corporation, New York, N.Y.

[21] Appl. No.: 261,651

[22] Filed: Oct. 24, 1988

Related U.S. Application Data

[62] Division of Ser. No. 56,039, May 28, 1987, Pat. No. 4,801,572.

[51] Int. Cl.$^5$ ............................ C08F 4/24; C08F 10/02
[52] U.S. Cl. .................................. 526/106; 526/348.5; 526/908
[58] Field of Search ............................ 526/91, 106

[56] References Cited

U.S. PATENT DOCUMENTS

| | | |
|---|---|---|
| 2,846,425 | 8/1958 | Hogan et al. . |
| 3,715,321 | 2/1973 | Horvath ............................ 526/106 |
| 3,960,826 | 6/1976 | Abontbone et al. ............... 526/106 |
| 3,996,163 | 12/1976 | Crump et al. . |
| 4,011,382 | 3/1977 | Levine et al. ....................... 526/106 |
| 4,368,302 | 1/1983 | Downs . |
| 4,374,234 | 2/1983 | Sticklen et al. . |

FOREIGN PATENT DOCUMENTS

| | | |
|---|---|---|
| 0004647 | 10/1979 | European Pat. Off. . |
| 0018108 | 10/1980 | European Pat. Off. . |
| 186174 | 7/1986 | European Pat. Off. ............ 526/106 |
| 1203472 | 10/1965 | Fed. Rep. of Germany . |
| 1326167 | 8/1973 | United Kingdom ................ 526/106 |
| 2023153 | 12/1979 | United Kingdom . |

*Primary Examiner*—Edward J. Smith
*Attorney, Agent, or Firm*—Alexander J. McKillop; Charles J. Speciale; Stanislaus Aksman

[57] ABSTRACT

A modified supported catalyst for polymerizing alpha-olefins, for example, ethylene, is prepared by combining a chromium compound-containing catalyst with a modifier which is an oxide of an element of Group II A of the Periodic Chart of the Elements. The resulting modified catalyst composition, when used to polymerize alpha-olefins, produces polymer resins having higher values of High Load Melt Index ($I_{21}$) than catalyst compositions without the modifier.

There is also disclosed a process for polymerizing alpha-olefins, at relatively lower temperatures than was heretofore possible, to obtain resins of relatively high HLMI, using the above-identified modified catalyst composition. The resulting polymers can be used for the fabrication of blow-molded products, e.g., household and industrial containers.

48 Claims, 1 Drawing Sheet

FIG. 1

MODIFIED CHROMIUM-CONTAINING CATALYST COMPOSITION FOR POLYMERIZING ALPHA-OLEFINS

This is a divisional of copending application Ser. No. 056,039, filed on May 28, 1987, now U.S. Pat. No. 4,801,572.

BACKGROUND OF THE INVENTION

1. Field of the Invention

The present invention is directed to a chromium compound-containing catalyst also known as 1-olefins, to a method for producing such a catalyst and to a method of polymerizing such olefins. More particularly, the invention is directed to a method of producing resins which are polymers of ethylene or copolymers of ethylene and at least one $C_3$–$C_{10}$ alpha-olefin, which have relatively high values of high load melt index (HLMI).

2. Description of the Prior Art

Chromium compound-containing alpha-olefin polymerization catalysts, also known as Phillips catalysts, have been extensively described in the literature. They are formed by supporting chromium trioxide, or a compound calcinable thereto, on a refractory oxide support material, for example, silica, alumina, zirconia, thoria or silica-alumina, and heating the oxide support material in a non-reducing atmosphere, preferably an oxidizing atmosphere, to produce an active polymerization catalyst. The produced catalyst is used to polymerize 1-olefins using the so-called "solution form" or "particle form" process. In the "solution form" process, the monomeric 1-olefin, which is normally ethylene or a mixture of ethylene with up to about 40 wt. % of other 1-olefins, is contacted with a suspension of the catalyst in a liquid hydrocarbon which is a solvent for the polymer at the polymerization temperature employed. In the "particle form" process, the monomer 1-olefin is contacted with a suspension or a fluidized bed of the catalyst particles in a fluid medium under conditions such that the polymeric 1-olefin forms as solid particles suspended in or fluidized in the fluid medium. The fluid medium can be, for example, a liquid hydrocarbon or a gas. Examples of suitable liquid hydrocarbons are isobutane and n-pentane. Examples of suitable gases are nitrogen or argon mixed with the gaseous monomer, or the undiluted gaseous monomer. Processes of this type are described in, for example, U.K. published patent specifications 790,195; 704,641; 853,414; 886,784 and 899,156. It is also known to modify such catalysts with a titanium compound, for example, to render the catalyst capable of producing polyolefins having increased melt index (i.e., lower average molecular weight) or to increase the stress crack resistance of the produced polyolefin. Catalysts of this type are described in, for example, U.S. Pat. No. 3,622,521 to Hogan et al and U.K. published patent specifications 1,334,662 and 1,326,167.

U.S. Pat. No. 3,351,623 to Walker et al discloses a catalyst for polymerizing ethylene at a temperature in the range of 275° to 335° F., i.e., under solution form process conditions, the catalyst being one which forms on mixing (1) an oxide component selected from the group consisting of silica; mixtures of silica and alumina containing up to 25 wt. % alumina; and mixtures of chromium oxide and at least one material selected from the group consisting of silica, alumina, zirconia and thoria, at least part of the chromium oxide being in the hexavalent state at the initial contacting of the monomer therewith, (2) an organo metallic component of formula $R_xM$ where R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconium, cobalt, magnesium and tin; and x is an integer equal to the valence of M, and (3) a vanadium component selected from the group consisting of vanadium chelates and vanadyl chelates. Walker et al seek to produce a catalyst that permits the use of high polymerization temperatures to obtain relatively low melt index polymer.

Downs, U.S. Pat. No. 4,368,302, discloses a modified alpha-olefin catalyst composition used in preparing polymers of ethylene or copolymers of ethylene and higher alpha-olefins, having a relatively broad molecular weight distribution, as evidenced by relatively high values of melt flow ratio (MFR), referred to by Downs as melt index ratio (MIR). The catalyst composition of Downs is prepared by supporting chromium oxide on a refractory oxide support material, adding at least one tetravalent titanium compound and heating to activate the product. The monomer is contacted with the active polymerization catalyst in the presence of one or more organometallic compounds, e.g., triethylaluminum. The refractory oxide support has a mean particle diameter of about 20–150 microns ($\mu$).

U.K. Patent Application 2,023,153 to Eve discloses an ethylene polymerization catalyst comprising: (A) a heat activated supported chromium oxide catalyst, and (B) a catalyst modifier comprising a magnesium compound, such as a dialkyl magnesium, preferably dibutyl magnesium, and a commercially available product believed to comprise a mixture of dibutyl magnesium, dialkyl magnesium and butyl-alkyl magesium. The polymerization process, conducted in the presence of this catalyst, produces polyethylene or ethylene copolymers having broad molecular weight distribution and low melt index. The quantity of the catalyst modifier is such that the atomic ratio of magnesium to chromium in the modified catalyst system is 0.01:1 to 100:1, preferably, 0.01:1 to 10:1.

Stricklen et al., U.S. Pat. No. 4,374,234, disclose a silica-supported chromium catalyst to which is added up to 5 ppm of an aluminumalkyl or dihydrocarbomagnesium compound in order to reduce the induction period and increase catalyst activity. The addition of the aluminum or the magnesium compounds has only a modest effect on polymer properties.

When polymers of ethylene or copolymers of ethylene and of one or more $C_3$–$C_{10}$ alpha-olefin useful for the blow-molding applications, e.g., for the HIC market, are produced using the above-identified prior art catalysts in a fluid bed reactor, the reaction must either be conducted at relatively high temperatures of about 108°–110° C., approaching melting or sintering temperatures of the product resin, or with a relatively high level of oxygen intentionally added to the reactor (oxygen add-back) to produce a resin having the desired high load melt index (HLMI).

The operation of fluid bed reactor at the high temperature requires very elaborate control apparatus to prevent fusion of the resin particles, particularly the small size resin particles (fines), e.g., particles of the size less than 74 microns ($\mu$) in the reactor, and particularly downstream of the reactor, e.g., in the recycle compressor. Since a typical resin produced with such a catalyst begins to melt and agglomerate at about 113° C., even minute temperature excursions above the reactor operating temperature can cause severe fines agglomeration, referred to in the art as fouling, in the process equipment downstream of the reactor, e.g., compressor and heat exchangers, due to melting and fusion of the fines.

As is known to those skilled in the art, the fluid bed alpha-olefin polymerization reactor system utilizes a recirculation compressor to recycle the fluidizing gas and unreacted monomers, if any, to the fluid bed reactor. The recycled fluidizing gas also contains at least some entrained polymer particles. The system also utilizes heat exchangers, usually located downstream of the compressor, to remove substantial amounts of exothermic heat generated during the reaction (e.g., see Goeke et al, U.S. Pat. No. 4,302,565). The compressor inherently increases the temperature of the gas stream compressed therein. Since the temperature gradient between the fluid bed reactor operating temperature and the melting temperature of the resin is very small (e.g., about 7°-9° C.), even a small elevation of the temperature of the fluidizing gas may cause fusion and agglomeration of the polymer particles in the compressor. If the temperature of the recycle gas is increased to the level wherein the fusion of the polymer particles takes place, the polymer particles will also tend to fuse and agglomerate in the heat exchangers and on the distribution plate of the reactor utilized to provide a uniform fluidized bed of particles therein.

The danger of polymer particles' fusion is exacerbated by the presence of catalyst particles in the polymer particles. As is known to those skilled in the art, the product polymer particles, also referred to herein as resin particles, produced in the polymerization reactor system, contain minute amounts of the catalyst particles which are not removed therefrom because the content thereof in the resin is so small as to render the removal of the catalyst particles unnecessary. The catalyst is inactivated when the resin is removed from the reactor. However, the resin in the reactor system contains catalytically-active catalyst particles. These catalytically active catalyst particles continue to promote the alpha-olefin polymerization reaction which is exothermic in nature, thereby producing additional amounts of heat. This heat, together with the inherent increase of the recycle gas temperature in the recycle compressor, combines to dangerously decrease the safety temperature margin between the reactor operating temperature and the resin fusion temperature. The polymer particles most susceptible to fusion are polymer fines. If fusion and agglomeration of polymer particles, particularly polymer fines, takes place in the recycle compressor, heat exchangers, on the distribution plate and/or any other parts of the polymerization system, the process efficiency is substantially decreased, and, ultimately, the fluidized bed system may have to be shut down to remove the fused polymer particles.

As mentioned above, the HLMI of the resin may also be increased by increasing the amount of oxygen added to the reactor, e.g., see Dalig et al. *KHIMIYA I TEKNOLOGIYA POLYMEROV*, Vol. 23, No. 4 (1961), Ermakov et al, "Transfer Processes During Polymerization of Ethylene on a Chromium Oxide Catalyst. II. The Role of Impurities In Transfer Reactions", *KINETICS AND CATALYSIS (USSR)*, Vol. 10, No. 333 (1969). However, the increased oxygen content in the reactor may promote the formation of polymer fines, which are most likely to fuse in the reactor system. The alpha-olefin fluidized bed reactors, unlike fluidized bed reactors used in different chemical processes, e.g., fluid catalytic cracking, do not usually utilize fines removing equipment, such as cyclones or filters, because, it is feared that such equipment may provide additional sites for fines to fuse and agglomerate. Thus, any polymer fines produced in the polymerization system tend to remain in the reactor loop. Accordingly, the use of relatively high amounts of oxygen to obtain resins of a desired HLMI may also lead to the fouling of the process equipment, such as compressor and heat exchangers, and, ultimately, to the shut-down of the reactor system.

A catalyst composition capable of producing alpha-olefin polymer resins at a relatively low polymerization temperature and at relatively low levels of oxygen is disclosed in a co-pending patent application of Hsieh et al, Ser. No. 939,323, filed on Dec. 8, 1986, the entire contents of which are incorporated herein by reference. That catalyst composition comprises a chromium compound and a tetravalent titanium compound supported on a refractory oxide support. The catalyst particles are substantially non-spherical and irregular in shape and they have a relatively broad particle size distribution range. The support has at least 75% of its pore volume in pores of about 200 to about 500 Angstrom diameter. The catalyst composition is synthesized with at least one tetravalent titanium compound; with $CrO_3$ or any compound of chromium calcinable thereto; and it is activated by heating the catalyst for at least about 10 hours at a temperature of at least about 800° C.

I now found that chromium-containing catalyst compositions can be modified to produce alpha-olefin resins having high HLMI at temperatures and at added oxygen levels lower than those possible with previously-available catalyst compositions.

Accordingly, it is a primary object of this invention to provide an improved polymerization catalyst which produces polymers of HLMI suitable for the blow molding applications at substantially lower operating temperatures than was heretofore possible with other similar catalysts.

It is an additional object of the present invention to provide an alpha-olefin polymerization process which produces polymer resins of ethylene and/or $C_3$-$C_{10}$ alpha-olefins, having such an HLMI that they are suitable for the blow molding applications, at lower temperatures than was heretofore thought possible.

Additional objects of the invention will become apparent to those skilled in the art from the following specification and the attached claims.

SUMMARY OF THE INVENTION

A modified alpha-olefin polymerization catalyst composition, also referred to herein as a catalytic complex, is obtained by combining a chromium compound-containing catalyst composition with a catalyst modifier which is an oxide of an element of Group II A of the Periodic Chart of the Elements, published by the Fisher Scientific Company, Catalog Number 5-702-10, containing at least about 0.5% by weight of water. Preferably, the modifier has the particle size distribution range compatible with that of the catalyst composition. The modified catalyst composition is used to polymerize $C_2$-$C_{10}$ alpha-olefins to form resins having higher HLMI values than those produced with the catalyst composition devoid of the modifier. The resins having high HLMI values can be prepared with the catalyst composition of the invention even without oxygen intentionally added to the polymerization reactor.

DETAILED DESCRIPTION OF THE INVENTION

The modified catalyst composition is prepared by combining the modifier with any supported chromium-containing alpha-olefin polymerization catalyst composition in any suitable manner. Suitable catalyst compositions of this type are supported chromium catalysts disclosed, for example, by Hogan et al, U.S. Pat. No. 3,622,521, or Levine et al, U.S. Pat. No. 4,011,382, and Hogan et al, U.S. Pat. No. 2,825,721, the entire contents of all of which are incorporated by reference herein. Suitable chromium compounds include chromium nitrate, chromium carbonate, chromium acetate, ammonium chromate, chromium fluoride, tertiary butyl chromate, chromium acetylacetonate and chromium sulphate. Water soluble compounds of chromium, such as $CrO_3$, are the preferred compounds used to deposit the chromium compound on the refractory oxide support from a solution thereof. However, organic solvents-soluble chromium compounds may also be used.

The polymerization catalyst composition also preferably contains at least one titanium compound. The titanium compound or compounds which may be used include all titanium compounds which are oxidizable to $TiO_2$ under the activation conditions employed, and include those disclosed in U.S. Pat. No. 3,622,521 and Netherlands Patent Application 72-10881 (the disclosures of both of which are incorporated herein by reference). These compounds include those having the structures $(R_1)_n Ti(OR_1)_m$, $(R_2O)_m Ti(OR_1)_n$, $(R_1)_n TiX_m$, $(RO)_n TiX_m$ and $TiX_4$ where m is 1, 2, 3 or 4, n is 0, 1, 2 or 3 and m+n=4; $R_1$ is a $C_1$ to $C_{12}$ alkyl, aryl or cycloalkyl group, and combinations thereof, such as aralkyl and alkaryl groups, $R_2$ is $R_1$, a cyclopentadienyl group, $C_2$ to $C_{12}$ alkenyl groups, such as ethenyl, propenyl, isopropenyl or butenyl, and X is chlorine, bromine, fluorine or iodine.

The titanium compounds thus include titanium tetrachloride, titanium tetraisopropoxide and titanium tetrabutoxide. The titanium compounds are conveniently deposited on the support from a hydrocarbon solvent solution thereof.

The amount of chromium and titanium compounds on the catalyst will depend on a particular catalyst composition used in a particular process context.

The modifier may be blended with the catalyst composition outside of the polymerization reactor after both, the catalyst composition and the modifier, are separately prepared by their respective processes. Alternatively, the catalyst modifier may be introduced into the polymerization reactor while the catalyst composition is introduced separately into the polymerization reactor. However, in a preferred embodiment, the catalyst modifier is dry blended with the catalyst composition outside of the polymerization reactor and the thus-produced modified catalyst composition is then used in the polymerization reactor. It is important that the modifier contain at least some water in the form of moisture. Thus, the modifier must contain at least about 0.5, preferably at least about 1, more preferably at least about 1.5, and most preferably about 2% by weight of water. The water may be incorporated into the modifier by any convenient means, such as exposing the modifier for a sufficient period of time to ambient atmosphere to produce the modifier containing the aforementioned amounts of water, contacting the modifier with moisture-containing gaseous stream or with liquid water, or by any other convenient means. Preferably, the water is incorporated into the modifier by equilibrating the required amount of the modifier in an ambient atmosphere containing moisture. It is also important that the particle size distribution range of the modifier be compatible with that of the catalyst composition. Thus, the particle size distribution of the modifier should be compatible with that of the catalyst composition with which it is combined but it need not be identical thereto. The term "compatible" is used herein to designate such a particle size distribution which enables the modifier to be readily blended with the catalyst composition. The amount of the catalyst modifier is about 1 to about 15, preferably about 3 to about 9 and most preferably about 5 to about 7% by weight based on the total weight of the catalyst composition. Suitable catalyst modifiers are beryllium oxide, magnesium oxide, calcium oxide, strontium oxide, barium oxide, and radium oxide, preferably calcium or magnesium oxide, and most preferably magnesium oxide. It is also possible to use a mixture of the aforementioned catalyst modifiers so long as the total amount of the sum of all of the modifiers is within the aforementioned weight percentage amounts. In a preferred embodiment, however, only one catalyst modifier is used to obtain the modified catalyst composition of the present invention.

Most Preferred Embodiment

In the most preferred embodiment, the modified catalyst composition of the present invention is prepared with the catalytic composition of Hsieh et al, described and claimed in a co-pending patent application, Ser. No. 939,323, filed on Dec. 8, 1986 (hereinafter referred to as "the catalyst composition of Hsieh et al"). Accordingly, for the purposes of simplification and exemplification, the invention will now be described in conjunction with the most preferred embodiment of the invention. However, it will be apparent to those skilled in the art that the invention is not limited to this preferred embodiment since the modified catalyst composition of the invention can be prepared with any chromium-containing alpha-olefin polymerization catalyst (i.e., any "Phillips catalyst").

The catalyst of Hsieh et al is prepared in a process comprising the steps of:

1. drying or dehydrating the refractory oxide support material at a temperature of about 100° to about 500° C., preferably at about 150° C. to about 300° C., and most preferably at about 200° C. for at least about 14 hours (hrs), preferably at least about 16 hours, and most preferably for about 16 hrs in a nitrogen atmosphere;

2. if required, depositing a chromium compound onto the dried support and drying the chromium-containing support at 200° C. for at least about 14 hours;

3. contacting the thus-obtained catalyst intermediate with at least one tetravalent titanium compound; and 4. purging the flammable components with nitrogen, preferably at about 325° C., and subsequently thermally activating the resulting solid, in an air atmosphere, at a temperature of at least about 800° C., preferably at least about 820° C., more preferably at about 820° to about 870° C., and most preferably at about 825° C. for at least about 10 hrs; preferably at least about 14 hrs, more preferably for least about 16 hrs, and most preferably for about 16 hrs, to obtain an active catalyst composition.

In a preferred embodiment of the Hsieh et al catalyst synthesis, the refractory oxide support has a chromium compound deposited thereon prior to the drying or dehydration thereof in step 1. Thus, in such an embodiment, step 2., above, is omitted.

The refractory oxide support material used to synthesize the Hsieh et al catalyst can be any support known in the art, such as silica, silica-alumina, silica-titania, alumina, zirconia or thoria, so long as it produces catalyst particles which are non-spherical and irregular in shape and of such size that the diameter of the catalyst particles is about 5 to about 250 microns ($\mu$), preferably about 10 to about 200 $\mu$, as determined by Scanning Electron Microscopy (SEM). The majority of the particles of the Hsieh et al catalyst must have relatively large particle diameters. Thus, the catalyst has a median particle diameter of about 50 to about 100, preferably about 60 to about 80 and most preferably about 75 $\mu$, as determined by volume distribution using a HIAC-ROYCO PA-720 particle size analyzer, and it has the following particle size distribution:cumulative volume distribution—10 to 90% of the particles have diameters of about 28 to about 150, preferably about 30 to about 125 and most preferably about 37 to about 117 $\mu$, also as determined in a HIAC-ROYCO particle size analyzer. Additionally, at least 75% of the refractory oxide support's pore volume is in the pores of about 200 to about 500 Angstrom diameter, preferably at least 80% of its pore volume is in the pores of about 250 to about 450 Angstrom diameter, and most preferably at least 85% of its pore volume is in the pores of about 250 to about 450 Angstrom diameter. The most preferred refractory oxide support material used for the Hsieh et al catalyst is silica containing about 0.18% by weight of chromium trioxide ($CrO_3$) and having about 88% of its pore volume in the pores of about 250 to about 450 Angstrom diameter, and particle diameter of about 10 to about 200 microns, available commercially from Joseph Crosfield & Sons Ltd., Applied Silicas Division, Warrington, England, under the tradename of SD-186.

The chromium compound and the tetravalent titanium compound are usually deposited on the support from the solutions thereof and in such quantities as to provide, after the activation step, the desired levels of chromium (Cr) and titanium (Ti) in the catalyst. The order of addition of the chromium and the titanium compounds to the support is not critical, provided that such compounds are added before the activation of the catalyst and the support is dried before the titanium compound is added thereto. However, it is preferred to deposit the chromium compound onto the support before the titanium compound.

The chromium compound is $CrO_3$ or any compound of chromium which is calcinable thereto under the activation conditions employed during the Hsieh et al catalyst synthesis. At least a portion of the chromium in the supported, activated catalyst must be in the hexavalent state. Chromium compounds, other than $CrO_3$, which may be used are those disclosed above as being suitable for the preparation of the chromium compound-containing alpha-olefin polymerization catalysts, such as those of Hogan et al., U.S. Pat. Nos. 2,825,721 and 3,622,521, and include chromium nitrate, chromium carbonate, chromium acetate, ammonium chromate, chromium chloride, tertiary butyl chromate, chromium acetylacetonate, and chromium sulphate.

Water soluble compounds of chromium, such as $CrO_3$, are the preferred chromium compounds used in the Hsieh et al catalyst synthesis. However, organic solvents-soluble chromium compounds may also be used.

After the chromium compound is deposited on the support, the chromium compound-containing support is dehydrated or dried at the aforementioned conditions.

Subsequently, the dehydrated catalyst intermediate is contacted with a titanium compound or compounds. Suitable titanium compounds which may be used are also those disclosed above as being suitable for the preparation of the chromium and titanium compound-containing alpha-olefin polymerization catalysts.

The most preferred titanium compound is tetraisopropyltitanate. The amount of the titanium compound used is such that there is an excess of the moles of titanium (calculated as elemental titanium) with respect to the moles of chromium (calculated as elemental chromium) in the catalyst composition. Thus, the titanium (calculated as elemental titanium) is present in the final catalyst product, with respect to the chromium (calculated as elemental chromium), in a molar ratio of about 0.5 to about 180, and preferably about 4 to about 35.

After the titanium compound is deposited on the catalyst, the resulting solid material is activated at the aforementioned conditions.

The activated supported catalyst of Hsieh et al contains, based on the combined weight of the support and the chromium and titanium therein, about 0.05 to about 3.0, preferably about 0.10 to about 0.25, more preferably about 0.13 to about 0.18 and most preferably about 0.15 to about 0.18 weight percent of chromium (calculated as elemental chromium), and about 1.5 to about 9.0, preferably about 3.0 to about 7.0 and most preferably about 3.7 to about 6.0 weight percent of titanium (calculated as elemental titanium).

The resulting activated catalyst composition is then combined with the modifier and the resulting modified catalyst composition, when used, preferably in the presence of small amounts of hydrogen, to polymerize alpha-olefins is extremely effective in preparing alpha-olefin polymers suitable for blow-molding applications, such as for the HIC market, i.e., alpha-olefin polymers having relatively low die swell characteristics which render them suitable for the preparation of household and industrial containers, e.g., household cleaners bottles and possibly even products requiring higher HLMI values, such as milk bottles. Since it is preferred that the particle size distribution of the modifier be compatible with that of the catalyst composition, the modifier combined with the Hsieh et al catalyst composition has the particle diameter of about 5 to about 250, preferably about 10 to about 200, and most preferably about 45 to about 180 microns.

The modified catalyst composition is used to polymerize either ethylene alone or ethylene in conjunction with higher monomers, such as any one of $C_3$–$C_{10}$ alpha-olefins, e.g., 1-butene, 1-pentene, 1-hexene, 4-methyl-1-pentene, 1-heptene or 1-octene, preferably 1-butene, 1-pentene, 1-hexene or 4-methyl-1-pentene and most preferably 1-hexene. The polymerization reaction is preferably carried out in a fluid bed reactor, as described below, and substantially in the absence of catalyst poisons, such as moisture, carbon monoxide and acetylene, with a catalytically effective amount of the modified catalyst composition at a temperature and pressure conditions sufficient to initiate the polymerization reaction.

In order to achieve density ranges of about 0.915 to about 0.965 g/cc in the copolymers, which includes the range of about 0.947 to about 0.959 g/cc required for HIC applications, it is necessary to copolymerize enough of the $C_3$ or higher comonomers with ethylene to achieve a level of about 0.1 to about 25 mole percent of the $C_3$ to $C_{10}$ comonomer in the copolymer. The amount of comonomer needed to achieve this result will depend on the particular comonomer(s) being employed. Further, the various intended comonomers have different reactivity rates, relative to the reactivity rate of ethylene, with respect to the copolymerization thereof with the catalysts of the present invention. Therefore, the amount of comonomer used in the stream of monomers fed to the reactor will also vary depending on the reactivity of the comonomer.

In the most preferred embodiment, the modified catalyst composition of the present invention is used to polymerize 1-hexene and ethylene in a fluid bed process to obtain polymers having the density of about 0.947 to about 0.959 g/cc, which are especially suitable for HIC applications.

The modified catalyst composition of this invention is especially suitable for producing polymers of $C_2$–$C_{10}$ alpha-olefins in a gas phase, fluid bed reactor in the presence of about 0 to about 0.35 ppmw of oxygen, calculated on the basis of ethylene feed because it makes possible the operation of the reactor at a temperature not higher than about 108° C., preferably not higher than about 105° C., to produce polymer resins having HLMI values of about 25–60, preferably about 30–50, and most preferably about 40–50. As is known to those skilled in the art, heretofore-used Phillips catalysts required gas phase fluid bed reactor temperatures of about 108° C.–110° C. to produce polymer resins having the aforementioned HLMI values. The resins must have these HLMI values to render them suitable for processing in blow-molding machines to produce products for the HIC market, such as bottles having high environmental stress crack resistance. Since the resins begin to fuse and agglomerate at about 113° C., the reactor operation at about 108°–110° C. may, and occasionally does, cause at least partial fusion of fine resin particles downstream of the fluidized bed reactor, e.g., in the compressor used to recirculate the reactor gases. In prior art, the HLMI of the resin was also increased the amount of oxygen or oxygen-containing gas (oxygen add-back), such as air, added to the gas phase, fluid bed reactor. While the reactor operation with the higher oxygen add-back increased the HLMI to the desired level, it also created additional quantities of resin fines which increased the risk of fouling of the process equipment, such as the gas recirculation compressor and heat exchangers.

The modified catalyst composition of this invention substantially decreases, if not completely eliminates, the danger of process equipment fouling because, at a given level of oxygen introduced into the reactor, it enables the operation of the polymerization reaction at a substantially lower temperature than was heretofore thought possible to produce polymer resins having the desired HLMI values. Thus, the safety margin between the reactor operating temperature and the resin fusion temperature is increased, thereby reducing, if not substantially eliminating, the danger of equipment fouling by the fused (melted) resin particles. It is also notable that the modified catalyst composition of the invention is capable of producing polymer resins having the aforementioned HLMI values even in the substantial absence of added oxygen. This is especially surprising since the catalyst composition of Hsieh et al required added oxygen in most instances to produce resins of the required HLMI, as set forth in the aforementioned application of Hsieh et al.

The operation of the fluidized bed reactor with the modified catalyst composition of the invention also produces substantially reduced amounts of polymer fines, as compared to the operation of the reactor at comparable conditions with the previously-available Phillips catalyst compositions. Since the polymer fines are most likely to fuse when the temperature safety margin is decreased, e.g., in the compressor or due to unanticipated temperature surges, the low level of fines provides additional protection against polymer fusion and agglomeration in the polymerization system.

Additionally, the feedability characteristics of the preferred modified catalyst composition of this invention, prepared with the catalyst composition of Hsieh et al, are improved in comparison to some prior art Phillips catalysts, as evidenced by the lack of agglomeration of the catalyst particles in the feeder of the fluid bed polymerization reactor. Some prior art catalyst compositions sometimes tended to clog up the feeding mechanism of the fluid bed reactor necessitating frequent process interruptions. The preferred modified catalyst composition of this invention exhibits substantially no tendency to clog up the fluid bed reactor feeding mechanism.

The modified catalyst composition of the preferred embodiment of the invention also has very good fluidizing properties, as evidenced by a substantial lack of sheeting in the reactor. This is especially surprising and unexpected since the prior art taught that spherically-shaped catalyst particles are easier to fluidize than irregularly shaped catalyst particles (see Hamer et al, U.S. Pat. No. 4,293,673). However, I found that the modified catalyst composition prepared with the catalyst composition of Hsieh et al, having non-spherical, irregularly-shaped particles, has very good fluidizing characteristics, in addition to the advantages detailed above.

Figure 1:
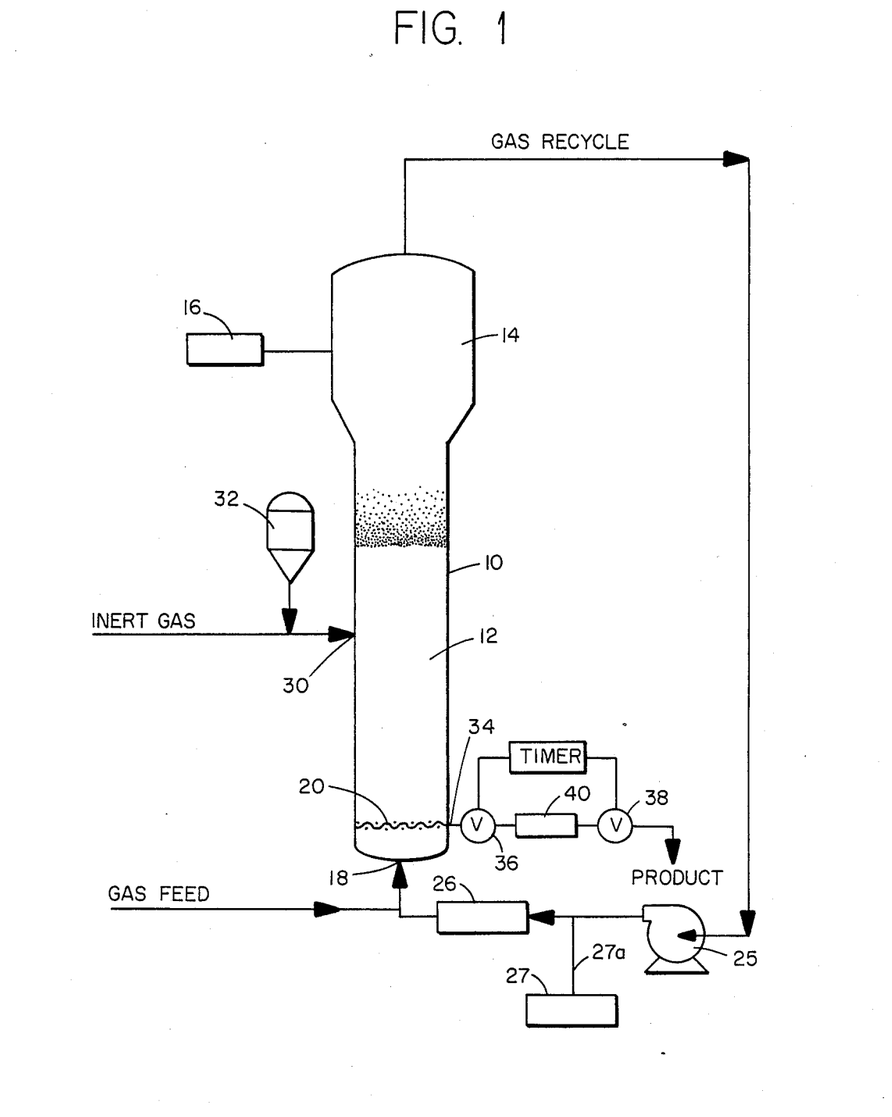
FIG. 1 is a schematic representation of a fluidized gas phase reaction apparatus which can be used to prepare polymers in the presence of the catalyst of this invention.

A fluidized bed reaction system which can be used in the practice of the process of the present invention is illustrated in FIG. 1. With reference thereto, a reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$, and more preferably from about 3 to about 6 times $G_{mf}$. The term $G_{mf}$ is used herein in the accepted form as the abbreviation for the minimum mass gas flow required to achieve fluidization, see C. Y. Wen and Y. H. Yu, "Mechanics of Fluidization", *Chemical Engi-* neering Progress Symposium Series, Vol. 62, p. 100–111 (1966).

The modified catalyst composition used in the fluidized bed is preferably stored for service in a reservoir 32 under a blanket of a gas which is inert to the stored material, such as nitrogen or argon.

Fluidization is achieved by a high rate of gas recycle to and through the bed, typically on the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled, and the composition of the make-up gas is adjusted accordingly to maintain an essentially steady state gaseous composition within the reaction zone.

To insure complete fluidization, the recycle gas and, where desired, a part of the make-up gas are returned to the reactor at point 18 below the bed. A gas distribution plate 20 is positioned above the point of return to aid in the fluidization of the bed.

The portion of the gas stream which does not react in the bed constitutes the recycle gas which is removed from the polymerization zone, preferably by passing it into a velocity reduction zone 14 above the bed where entrained particles are given an opportunity to return to the bed. No fines removal equipment, such as cyclones or filters, is used in the fluidized bed system because of the danger of fines fusing therein.

The recycle gas is compressed in a compressor 25 and then passed through a heat exchanger 26 wherein it is stripped of heat of reaction before it is returned to the bed. By constantly removing heat of reaction, no significant temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed, thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, or any similar plate known in the art. The elements of the plate may all be stationary, or the plate may be of the mobile type disclosed in U.S. Pat. No. 3,298,792, the entire contents of which are incorporated herein by reference. Whatever the design of the plate, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used in the polymerization reaction of the present invention in such amounts that the ratio of hydrogen to ethylene is between about 0 to about 2.0 moles of hydrogen per mole of the ethylene monomer in the gas stream. Any gas inert to the catalyst and reactants can also be present in the gas stream.

It is essential to operate the fluid bed reactor at a temperature below the sintering temperature of the polymer particles. To ensure that sintering will not occur, operating temperatures below the sintering temperature are desired. For the production of ethylene copolymers an operating temperature of about 30° to 105° C. is preferred, and a temperature of about 75° to 103° C. is most preferred. Temperatures of about 75° to 90° C. are used to prepare polymer products having a density of about 0.90 to 0.92 gms/cc, temperatures of about 80° to 100° C. are used to prepare products having a density of about 0.92 to 0.94 gms/cc, and temperatures of about 90° to 105° C. are used to prepare products having a density of about 0.94 to 0.96 gms/cc.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The modified catalyst is injected into the bed at a rate equal to its consumption at a point 30 which is above the distribution plate 20. The injection of the catalyst at a point above the distribution plate is an important feature of this process. Since the catalyst used in the practice of this invention is highly active, the injection of the fully activated catalyst into the area below the distribution plate may cause polymerization to begin in that area and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst, such as nitrogen or argon, is used to carry it and/or any additional modifier compound or compounds that are needed, into the bed.

The production rate of the bed is controlled by the rate of the catalyst injection. The production rate may be increased by simply increasing the rate of catalyst injection and decreased by reducing the rate of injection thereof.

Since any change in the rate of catalyst injection will change the rate of generation of the heat of reaction, the temperature of the recycle gas is adjusted upwards or downwards to accommodate the change in the rate of heat generation. This ensures the maintenance of an essentially constant temperature in the bed. It will be apparent to those skilled in the art that complete instrumentation of both the fluidized bed and the recycle gas cooling system is necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particulates settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst of this invention yields a fluid bed product having an average particle size between about 0.005 to about 0.07 inches and preferably about 0.02 to about 0.04 inches.

The feed stream of a gaseous monomer, with or without inert gaseous diluents, is fed into the reactor at a space time yield of about 2 to 10 pounds/hour/cubic foot of bed volume.

The use of the modified catalyst of the present invention in the fluidized bed polymerization process described above or in any other suitable olefin polymerization process, e.g., slurry process, produces polymers in which the net bottle weight and HLMI characteristics can be simultaneously controlled without adversely affecting other properties of the polymers, such as strength thereof. The modified catalyst of the invention can be used to produce both linear low density polyethylene (LLDPE) and high density polyethylene (HDPE), but it is preferably used to produce HDPE.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column; reported as gms/cc. |
| Melt Index (MI), $I_2$ | ASTM D-1238 - Condition E - Measured at 190° C. - reported as grams per 10 minutes. |
| High Load Melt Index (HLMI), $I_{21}$ | ASTM D-1238 - Condition F - Measured at 10 times the weight used in the melt index test above. |
| Melt Flow Ratio (MFR) | $= \dfrac{I_{21}}{I_2}$ |
| Weight Swell or Net Bottle Weight | Conducted on an Impco B-13 Blow Molding Machine. The machine is calibrated on a standard material, Marlex 5502, to give a 72.0 ± 1.0 g bottle at a parison drop time of 2.0 ± 0.03 sec. The test material is then introduced, and the machine readjusted to a 2.0 sec parison drop time. The measured weight is reported after correcting for the difference between the actual standard weight and 72.0 g. |
| Annular Die Swell (gr) | Measured by weighing 252 centimeters (cm) of a tube extruded at shear rate of 2000 1/sec through an annular die having a tapered entrance angle of 24.4°; die lend length of 3.05 mm; die gap of 0.505 mm and average die diameter of 5.16 mm. |

EXAMPLE 1

(Catalyst Synthesis)

A catalyst composition of Hsieh et al was prepared in the following multi-step procedure.

Step 1 (Drying)—A chromium oxide coated silica (0.18% wt. Cr, calculated as chromium trioxide) having about 88% of its pore volume in the pore sizes of between 250 and 450 Angstroms (Crosfield's SD-186) was introduced into a fluid-bed drying vessel maintained under nitrogen ($N_2$) at an ambient temperature and pressure. The temperature of the vessel was increased at the rate of 25° C./hour until it reached about 200°-210° C. The silica was dried in nitrogen atmosphere at about 200°-210° C. for 16 hrs. It was then cooled to below 100° C. in 2–4 hrs.

Step 2 (Titanation)—30.0 grams of the product of Step 1 was charged to a 250 ml flask along with 50 ml of dry hexane. 10.5 ml of tetraisopropyltitanate was added at room temperature and the resulting brown slurry heated to 60°–65° C. under a vigorous nitrogen purge until the solid was dry (about 16–24 hrs). The hexane was removed in an oil bath with the temperature set at 65° C. over the period of 16 hrs.

Step 3 (Activation)—Under good fluidization, the product of Step 2 was heated at 25° C./hr until it reached the temperature of 325° C. It was then heated at 325° C. for 2 hours in nitrogen; the nitrogen atmosphere was changed to air; the temperature was increased from 325° C. to 825° C. at 100° C./hr; and, it was heated for 16 hrs at 825° C. in dry air. The temperature was then decreased to 350° C. as fast as possible. At 350° C., the air was again changed to nitrogen, and the temperature was decreased to ambient as fast as possible. The nitrogen purge was maintained for 1 hour at ambient temperature. The product was a yellow-orange catalyst which analyzed as follows:

Cr=0.18% wt.
Ti=4.0% wt.

EXAMPLE 2

(Preparation of the Modified Catalyst of the Invention)

1.1 grams of the catalyst composition of Example 1 was dry-blended with 0.1 grams (g) of magnesium oxide (MgO) powder, obtained from Calgon Corporation, a subsidiary of Merck & Co., Inc., under the name of Maglite CG-1. The MgO powder, equilibrated to atmospheric moisture content, contained about 10% by weight (wt.) of water. The blending was carried out in a shaken Schlenk tube, for 15 minutes. The MgO particle size (about 100 to about 170μ) was compatible to that of the catalyst composition of Example 1 (10–200μ) and the two solids blended well. The resulting modified catalyst contained 9% by weight (wt %) of MgO.

EXAMPLE 3

(MgO-Containing Modified Catalyst)

One additional sample of the modified catalyst was prepared in the manner substantially similar to that of Example 2, except that a sufficient amount of the MgO was used to produce a modified catalyst containing 15 wt. % of the MgO.

EXAMPLE 4

(Polymerization of Ethylene With 1-Hexene)

Under dry nitrogen, a 2.5-gallon slurry reactor was filled with 4 liters of isobutane. Approximately 1.0 gram of the activated catalyst of Example 1 was transferred to the reactor. The reactor was then heated to 97° C., after which 15 ml of 1-hexene was added thereto. Finally sufficient ethylene was introduced into the reactor to provide ethylene partial pressure in the reactor of 120 psia. The polymerization was carried out for about 1 hour at 450 psig total pressure.

EXAMPLES 5-6

(Polymerization of Ethylene With 1-Hexene in the Presence of the Modified Catalyst)

Ethylene was polymerized substantially in the manner of Example 4 in the presence of the modified catalyst composition of Examples 2 and 3.

The results of Examples 4–6 are summarized in Table 1, below.

TABLE 1

| Example | Catalyst of Example | MgO Content (wt. %) | Catalyst Total wt. (g) | HLMI, g/10 min ($I_{21}$) | MFR ($I_{21}/I_2$) | Density (g/cc) | Annular Die Swell (g) | Productivity (g PE/g cat/hr) |
|---|---|---|---|---|---|---|---|---|
| 4 | 1 | 0  | 1.1 | 11.2 | 187 | 0.950 | 0.934 | 634 |
| 5 | 2 | 9  | 1.1 | 24.1 | 142 | 0.951 | 1.018 | 669 |
| 6 | 3 | 15 | 1.3 | 48.3 | 92  | 0.952 | 1.081 | 442 |

The data of Table 1 indicates that the addition of MgO to the catalyst composition produces a modified catalyst composition which produces polymers of substantially higher HLMI than similar catalyst compositions without the MgO modifier. The data also indicates that the modified catalyst composition produces polymers having acceptable die swell characteristics.

EXAMPLES 7-9

(Polymerization of Ethylene and 1-Hexene at Lower Temperatures)

These experiments were conducted to determine if the polymerization temperature had an effect on the HLMI-promotion properties of the modified catalyst composition.

The polymerization was conducted in a 2.5 liter (1) slurry reactor with 1.25 l of a diluent (specified in Table 2, below), at 90° C. 0.7 g of the catalyst and 3 cubic centimeters (cc) of 1-hexene were used in each example. The polymerization was conducted substantially in the manner of Example 4. In Examples 7 and 8, a catalyst composition of Hsieh et al, synthesized substantially in the manner of Example 1 was used. In Example 9, the modified catalyst composition, prepared substantially in the manner of Example 2 was used.

TABLE 2

| Ex. | Diluent | MI ($I_2$) | HLMI, g/10 min ($I_{21}$) | MFR ($I_{21}/I_2$) | Density (g/cc) | Productivity (g PE/g cat-hr) |
|---|---|---|---|---|---|---|
| 7 | isobutane | 0.0287 | 10.2 | 355 | 0.949 | 555 |
| 8 | hexane    | 0.0282 | 12.1 | 433 | 0.951 | 432 |
| 9 | hexane    | 0.0268 | 10.6 | 395 | 0.962 | 448 |

The data of Table 2 indicates that at 90° C., the catalyst modifier, when used to modify the Hsieh et al catalyst, had substantially no effect on the HLMI properties of the resin. Accordingly, it is likely that for every given catalyst composition, there is a threshold polymerization temperature necessary for the manifestation of the effect of the catalyst modifier on the HLMI of the polymer resin.

EXAMPLES 10-11

(Effect of Dried Modifier)

These examples were conducted to determine the effect, if any, of the dried MgO on the HLMI properties of the resin produced with a catalyst composition combined with a dried catalyst modifier.

The catalyst substantially similar to that of Example 1 was used in Example 10. In Example 11, the catalyst of Example 10 was combined with 15% wt., based on weight of the catalyst, of MgO, obtained from Calgon under the name Maglite CG-1, having the particle size of about 45 to about 150μ, which was dried for 16 hrs at 200° C. under purified flowing nitrogen ($N_2$). The catalyst of Example 10 and the resulting modified catalyst composition of Example 11 were used to polymerize ethylene having a partial pressure of 120 psia with 5 ml of 1-hexene in a 1 gallon slurry reactor at 97° C., containing 1 liter of the isobutane diluent, in the presence of 1 gram of the catalyst of Hsieh et al or the modified catalyst of this invention. The results are summarized in Table 3.

TABLE 3

| Ex. | Catalyst | MI ($I_2$) | HLMI ($I_{21}$) | FR ($I_{21}/I_2$) | Density (g/cc) | Productivity (g PE/g cat-hr) |
|---|---|---|---|---|---|---|
| 10 | Hsieh et al | 0.106 | 16.3 | 154 | 0.955 | 468 |
| 11 | Hsieh et al plus 15% | 0.069 | 15.5 | 225 | 0.956 | 419 |

TABLE 3-continued

| Ex. | Catalyst | MI ($I_2$) | HLMI ($I_{21}$) | FR ($I_{21}/I_2$) | Density (g/cc) | Productivity (g PE/g cat-hr) |
|---|---|---|---|---|---|---|
| | dried MgO | | | | | |

The data of Table 3 indicates that the dried MgO promoter produces polymer resins having substantially similar HLMI characteristics as the catalyst composition of Hsieh et al without the promoter.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. In a process of preparing a polymer by polymerizing at least one $C_2$-$C_{10}$ alpha-olefin in the presence of a supported chromium compound-containing catalyst composition, which is activated by heating it in an oxidizing atmosphere, wherein the chromium compound is $CrO_3$ or any compound of chromium calcinable to $CrO_3$ under the catalyst activation conditions, an improvement comprising polymerizing the polymer in the presence of a modified catalyst composition obtained by combining the supported catalyst composition with a catalyst modifier which is an oxide of an element of Group IIA of the Periodic Chart of the Elements, containing at least about 0.5% by weight of water.

2. A process of claim 1 which is a fluidized bed process.

3. A process of claim 2 wherein the supported catalyst composition, prior to the catalyst activation, additionally comprises a titanium compound which is oxidizable to $TiO_2$ under the catalyst activation conditions.

4. A process of claim 3 wherein the catalyst modifier has particle size distribution range compatible with that of the supported catalyst composition.

5. A process of claim 4 wherein the supported catalyst composition is substantially non-spherical and irregular in shape, and it has a relatively broad particle size distribution range.

6. A process of claim 5 wherein particle diameter of the catalyst modifier is about 5 to about 250$\mu$.

7. A process of claim 6 wherein the particle diameter of the catalyst modifier is about 10 to about 200$\mu$.

8. A process of claim 7 wherein the particle diameter of the catalyst modifier is about 45 to about 180$\mu$.

9. A process of claim 8 wherein the catalyst modifier contains at least about 1% by weight of water.

10. A process of claim 9 wherein the catalyst modifier contains at least about 1.5% by weight of water.

11. A process of claim 10 wherein the catalyst modifier contains at least about 2% by weight of water.

12. A process of claim 11 wherein the supported catalyst composition has the particle diameter of about 5 to about 250$\mu$.

13. A process of claim 12 wherein the supported catalyst composition has the particle diameter of about 10 to about 200$\mu$.

14. A process of claim 13 wherein the supported catalyst composition is combined with about 1 to about 15% by weight of the catalyst modifier.

15. A process of claim 14 wherein the supported catalyst composition is combined with about 3 to about 9% by weight of the catalyst modifier.

16. A process of claim 15 wherein the supported catalyst composition is combined with about 5 to about 7% by weight of the catalyst modifier.

17. A process of claim 16 wherein the supported catalyst composition has the following particle size distribution:cumulative volume distribution—10 to 90% of the catalyst particles have diameters of about 28 to about 150$\mu$, as determined in a HIAC-ROYCO PA-720 particle size analyzer.

18. A process of claim 17 wherein the supported catalyst composition has the following particle size distribution:cumulative volume distribution—10 to 90% of the catalyst particles have diameters of about 30 to about 125$\mu$, as determined in a HIAC-ROYCO PA-720 particle size analyzer.

19. A process of claim 18 wherein the supported catalyst composition has the following particle size distribution:cumulative volume distribution—10 to 90% of the catalyst particles have diameters of from about 37 to about 117$\mu$, as determined in a HIAC-ROYCO PA-720 particle size analyzer.

20. A process of claim 18 wherein the supported catalyst composition has a median particle diameter of about 50 to about 100$\mu$, as determined by volume distribution using a HIAC-ROYCO PA-720 particle size analyzer.

21. A process of claim 20 wherein the supported catalyst composition has a median particle diameter of about 60 to about 80$\mu$, as determined by volume distribution using a HIAC-ROYCO PA-720 particle size analyzer.

22. A process of claim 21 wherein the catalyst composition has a median particle diameter of about 75$\mu$, as determined by volume distribution using a HIAZ-ROYCO PA-720 particle size analyzer.

23. A process of claim 22 wherein the supported catalyst composition is supported on a refractory oxide support which has at least 75% of its pore volume in the pores of about 200 to about 500 Angstrom diameter.

24. A process of claim 23 wherein the refractory oxide support is silica having at least 80% of its pore volume in the pores of about 250 to about 450 Angstrom diameter.

25. A process of claim 24 wherein the refractory oxide support is silica having at least 85% of its pore volume in the pores of about 250 to about 450 Angstrom diameter.

26. A process of claim 24 wherein the supported catalyst composition contains about 0.05 to about 3.0% by weight of chromium, calculated as elemental chromium.

27. A process of claim 26 wherein the supported catalyst composition contains about 0.10 to about 0.25% by weight of chromium, calculated as elemental chromium.

28. A process of claim 27 wherein the supported catalyst composition contains about 0.13 to about 0.18% by weight of chromium, calculated as elemental chromium.

29. A process of claim 28 wherein the supported catalyst composition contains about 0.15 to about 0.18% by weight of chromium, calculated as elemental chromium.

30. A process of claim 29 wherein the refractory oxide support is silica containing 0.18% by weight of $CrO_3$ and having about 88% of its pore volume in the pores of about 250 to about 450 Angstrom diameter.

31. A process of claim 30 wherein, prior to the activation of the supported catalyst composition, the refractory oxide support is dehydrated at a temperature of about 100° to about 500° C. for at least about 14 hours in a nitrogen atmosphere.

32. A process of claim 31 wherein the refractory oxide support is dehydrated at a temperature of about 150° to about 300° C. for at least about 16 hours.

33. A process of claim 32 wherein the refractory oxide support is dehydrated at a temperature of about 200° C. for about 16 hours.

34. A process of claim 33 wherein, after the dehydration is completed, the titanium compound is deposited on the dehydrated refractory oxide support.

35. A process of claim 34 wherein, after the titanium compound deposition is completed, the supported catalyst composition is activated at a temperature of at least about 820° C. for at least about 16 hours.

36. A process of claim 35 wherein the supported catalyst composition is activated at a temperature of about 820° to about 870° C.

37. A process of claim 36 wherein the supported catalyst composition is activated at a temperature of about 825° C. for about 16 hours.

38. A process of claim 37 wherein the catalyst modifier is selected from the group consisting of beryllium oxide, magnesium oxide, calcium oxide, strontium oxide, barium oxide, radium oxide or mixtures thereof.

39. A process of claim 38 wherein the catalyst modifier is selected from the group consisting of calcium oxide and magnesium oxide.

40. A process of claim 39 wherein the catalyst modifier is magnesium oxide.

41. A process of claim 14 wherein the catalyst composition is combined with 9% by weight of magnesium oxide.

42. A process of claim 14 wherein the catalyst composition is combined with 15% by weight of magnesium oxide.

43. A process of claim 3 wherein the catalyst composition is activated by heating it at a temperature of at least about 800° C.

44. A process of claim 1 wherein the modifier enables the process to produce polymers of higher HLMI than those produced with the same catalyst composition at the same conditions without the modifier.

45. A process of claim 14 wherein the modifier enables the process to be conducted in a gas phase, fluid bed reactor at a temperature of not higher than about 108° C. to produce a polymer having HLMI of about 25–60.

46. A process of claim 45 wherein the modifier enables the process to be conducted at a temperature not higher than about 105° C. to produce a polymer having HLMI of about 30–50.

47. A process of claim 46 producing a polymer having HLMI of about 40–50.

48. A process of claim 45 conducted in the presence of about 0 to about 0.35 ppmw of oxygen.

* * * * *